United States Patent [19]

Bukoschek et al.

[11] Patent Number: 4,712,386
[45] Date of Patent: Dec. 15, 1987

[54] DISCOID COLD CARTRIDGE INSERTABLE INTO AN ICE-CREAM MAKER

[75] Inventors: Romuald L. Bukoschek; Merowech Eckel, both of Klagenfurt, Austria; Johann Schröder, Aachen, Fed. Rep. of Germany

[73] Assignee: U.S. Philips Corporation, New York, N.Y.

[21] Appl. No.: 877,560

[22] Filed: Jun. 23, 1986

[30] Foreign Application Priority Data

Jun. 26, 1985 [AT] Austria .................................. 1904/85

[51] Int. Cl.⁴ .............................................. A23G 9/12
[52] U.S. Cl. ........................................ 62/342; 62/529
[58] Field of Search ..................... 62/342, 529, 530; 126/400; 165/10 A

[56] References Cited

U.S. PATENT DOCUMENTS

| | | | |
|---|---|---|---|
| 2,203,591 | 6/1940 | Brown | 62/530 |
| 3,095,291 | 6/1963 | Robbins | 62/530 X |
| 4,205,535 | 6/1980 | Maurer | 62/342 |
| 4,211,208 | 7/1980 | Lindner | 165/10 A X |
| 4,248,291 | 2/1981 | Jarmul | 165/10 A X |
| 4,612,974 | 9/1986 | Yanadori et al. | 126/400 X |

*Primary Examiner*—William E. Tapolcai
*Attorney, Agent, or Firm*—Thomas A. Briody; William J. Streeter; Rolf E. Schneider

[57] ABSTRACT

A discoid cold cartridge filled with a latent heat storage medium, is formed from at least two parts joined together, of which one part includes the discoid main wall facing the scraper and stirrer tool and the other part of a trough-shaped base. The discoid main wall serving to act together with the scraper and stirrer tool has an inherently stable, curved shape and at least one wall of the base is reversibly adaptable to the change in volume of the latent heat storage medium in phase transition.

9 Claims, 5 Drawing Figures

DISCOID COLD CARTRIDGE INSERTABLE INTO AN ICE-CREAM MAKER

BACKGROUND OF THE INVENTION

The invention relates to a discoid cold cartridge insertable into an ice-cream maker, filled with a latent heat storage medium and with which a discoid main wall serves to act together with a scraper and stirrer tool of an ice-cream maker. An ice-cream maker serving as a domestic appliance has been previously disclosed in DE-OS No. 28 31 592, in which a cold cartridge of this type is used, which can preferably be divided in a plane, without any further details being given of its construction.

SUMMARY OF THE INVENTION

The object of the present invention is to design a cold cartridge of the above type having a simple construction and providing an efficient operation of the ice-cream maker, so that a high quality ice-cream can be produced efficiently. This object is attained, according to the present invention, with a cold cartridge formed from at least two parts joined together, of which one part consists of the discoid main wall facing the scraper and stirrer tool, and the other part of a trough-shaped base. The discoid main wall serves to act together with the scraper and stirrer tool having an inherently stable, curved shape and at least one wall of the base is itself reversibly adaptable to the change in volume of the latent heat storage medium in phase transition. Due to the fact that the discoid main wall, with which the scraper and stirrer tool of the ice-cream maker interacts, has a stable, non-changing form, the scraper and stirrer tool can continually scrape off, efficiently and uniformly, any ice-cream attaching to this discoid main wall, mix it and rotate it with the not yet frozen ice-cream mixture, which is essential to the production of a good quality of ice-cream. Additionally, the base allows a change in volume of the latent heat storage medium, as this occurs in its phase transition between fluid and solid and vice versa, in that at least one wall of the base can adapt to such a change in volume as a result of its flexibility, obtainable through a suitable selection of shaping, material and wall thickness. Thus, the discoid main wall which acts together with scraper and stirrer tool always retains its shape, whereas changes in volume of the latent heat storage medium are compensated by the base.

It should be mentioned that it is known in the art for the walling of accumulators of cold to be flexible so that changes in volume of the latent heat storage medium do not lead to damage to the accumulator of cold, as is specified in DE-OS No. 28 46 988, whereby changes in form in the accumulator of cold shown therein are not perceived to have a detrimental effect, since a tool or similar device does not act together with any wall section. In order to compensate for such changes in volume of a latent heat storage medium a proposal has already been made in the case of an ice-cream maker according to DE-GM No. 84 38 146 for joining the inherently stable base of a double-walled vessel containing the latent heat storage medium with the housing of the vessel by means of a flexible ring, so that the inherently rigid bottom wall can yield as a whole to the changes in volume of the latent heat storage medium. Such a design is however very laborious and costly. In contrast, in the case of a discoid cold cartridge, this can be achieved very simply through the measures according to the invention, in that the discoid main wall acting together with the scraper and stirrer tool does not change its form, and the change in volume of the latent heat storage medium is compensated in phase transition by at least one inherently flexible wall of the base.

For the inherent stability of the discoid main wall acting together with the scraper and stirrer tool it is its wall thickness and curvature which is of importance. The curvature may, for example, be conical. It has proven to be particularly advantageous for the curvature of the discoid main wall acting together with the scraper and stirrer tool to be cap-shaped. This provides a particularly high inherent stability.

Yet another advantage is gained through a curvature of the discoid main wall acting together with the scraper and stirrer tool. It is above all essential that the cold cartridge is as far as possible completely filled with the latent heat storage medium, so that it contains no air bubbles which would collect on the discoid main wall which acts together with the scraper and stirrer tool when the cold cartridge is in operating position in the ice-cream maker, which would considerably impair the transmission of heat between the latent heat storage medium and the discoid main wall. This would impede the formation of ice-cream in the vicinity of the air bubbles, which would not result in a uniform formation of ice-cream. The result of the curvature of the discoid main wall is that any air bubbles inside the cold cartridge will always collect at the highest point of the cold cartridge. Should the cold cartridge, for example, be curved inwards, any air bubbles will then collect around the edge of the cold cartridge, where they are less of a problem, since the other major part of the discoid main wall is in excellent heat contact with the latent heat storage medium and the formation of ice-cream is not significantly hindered. In this context, it has proven to be particularly advantageous for the discoid main wall acting with the scraper and stirrer tool to be curved outwardly. In this way, any air bubbles collect in the center of the cold cartridge where the scraper and stirrer tool has its smallest effect, so that the formation of ice-cream is practically unhindered.

It has further proven to be advantageous in this context for the bottom wall of the base to run essentially curved in parallel to the curvature of the discoid main wall acting with the scraper and stirrer tool and for a sealable filling opening for the latent heat storage medium to be provided in one of the two curved walls which is curved outwards. In this way, the filling opening is always located at the highest point of the cold cartridge, thus ensuring that it can be filled as completely as possible with latent heat storage medium and contains practically no more air bubbles.

Bearing in mind that at least one of the walls itself can adapt reversibly to the change in volume of the latent heat storage medium in phase transition, there are also various possibilities for the design of the base, one essential parameter being the selection of the wall thickness. Material and shape, however, also play an important role. Hence it has also proven to be very advantageous for the bottom wall of the base to be provided with beads. In this way the bottom wall of the base is highly flexible.

It has also proven to be advantageous for the circumferential walling of the base to have the form of a spring bellows. In this way the whole trough-shaped base is rendered highly flexible.

In terms of design and manufacture it has proven to be particularly simple for the trough-shaped base to be composed of resiliently flexible plastic. It should be mentioned that in the case of accumulators of cold it is known in the art for these to be manufactured completely from plastic, as previously mentioned in DE-OS No. 28 46 988. In contrast, however, in this particular case only the base of a cold cartridge, which should be inherently flexible, is manufactured from a resiliently flexible plastic, whereas the discoid main wall of the cold cartridge acting together with the scraper and stirrer tool is inherently stable.

In this context, it has proven to be advantageous for the trough-shaped base to be composed of transparent resiliently flexible plastic. In this way, the state of aggregation of the latent heat storage medium inside the cold cartridge can be determined visually, it being quite simple to check, for example, whether or not the latent heat storage medium has completely frozen prior to the use of the cold cartridge.

It has also proven to be advantageous for a gas spring containing a yielding occluded gas to be arranged inside the base in the vicinity of the bottom wall. With the use of such a gas spring containing air, it is possible to partially compensate for the changes in volume of the latent heat storage medium, as a result of which only minimal demands are made on the flexibility of the base, a design advantage.

There are various possibilities for the design of such a gas spring. It has proven to be simple and advantageous for the gas spring to comprise a flat container with flexible walls.

Equally simple and advantageous has proven to be the design of the gas spring as a spirally wound rubber hose sealed at both ends.

It has also proven to be particularly simple and advantageous for the gas spring to consist of a foam rubber disc. Such a foam rubber disc, which may consist, of natural rubber or silicon rubber with mainly closed pores, is not only simple and economical but also offers the further advantage of having a heat-insulating effect, thus avoiding heat loss from the base of the cold cartridge and favoring heat exchange with the discoid main wall interacting with the scraper and stirrer tool thereby promoting the formation of ice-cream on this discoid main wall.

It has further proven to be advantageous for the ratio of the surface area in cm$^2$ of the discoid main wall serving to act together with the scraper and stirrer tool to the volume in cm$^3$ of the latent heat storage medium to lie between 0.3 and 0.6. With this size of cold cartridge there is excellent transmission of heat from the latent heat storage medium to the discoid main wall acting with the scraper and stirrer tool, and as a result of which a uniform formation of ice-cream is obtained.

In this context it has proven to be particularly advantageous for the ratio of surface area in cm$^2$ of the discoid main wall, together with the scraper and stirrer tool to the volume in cm$^3$ of the latent heat storage medium to be between 0.34 and 0.39. A particularly favorable heat transmission from the latent heat storage medium to the discoid main wall acting with the scraper and stirrer tool is thus obtained, whereby the formation of ice-cream is neither too rapid nor too slow, as a result of which there are no lumps formed, nor is the formation of ice-cream insufficient due to excessive heat loss.

According to the invention, it is advantageous for an abutment to be provided for the scraper and stirrer tool in the center of the discoid main wall, together with the scraper and stirrer tool, and for this abutment to be formed by a part usable as a handle raised from the discoid main wall. Such an abutment for the scraper and stirrer tool, disclosed in DE-GM No. 84 38 146 in the form of an abutment shaped as a recess, ensures safe action of the latter together with the cold cartridge. In the present invention this abutment is formed by a part raised from the discoid main wall. This part can be used as a handle so that manipulation of the cold cartridge is simple, as for insertion of the cold cartridge into the ice-cream maker and its removal from the latter.

It has proven to be particularly advantageous for the abutment to be designed as a sealable filling opening for the latent heat storage medium. In this manner the provision of a separate filling opening is rendered superfluous and this can be located at a sufficiently high position for the cold cartridge to be filled as completely as possible with latent heat storage medium.

In the cold cartridges it is useful for these to be filled with a latent heat storage medium on the basis of a eutectic mixture of water and a salt hydrate, which contains a further 0.1 to 6 percent by volume of a second water-salt hydrate eutectic, the melting point of which is lower than that of the pure latent heat storage medium. Such latent heat storage mediums are known from the aforementioned DE-OS No. 28 46 988, but amongst the large number of other known latent heat storage mediums, these are particularly suitable for use in a cold cartridge of this type as in ice-cream maker. They have a particularly uniform expansion in phase transition, and as a result, the danger of damage to the flexible base is significantly reduced.

The invention will be described in further detail with reference to the drawings, which show several embodiments of the invention, to which it should not however be restricted.

DESCRIPTION OF THE PREFERRED EMBODIMENTS

Figure 1:
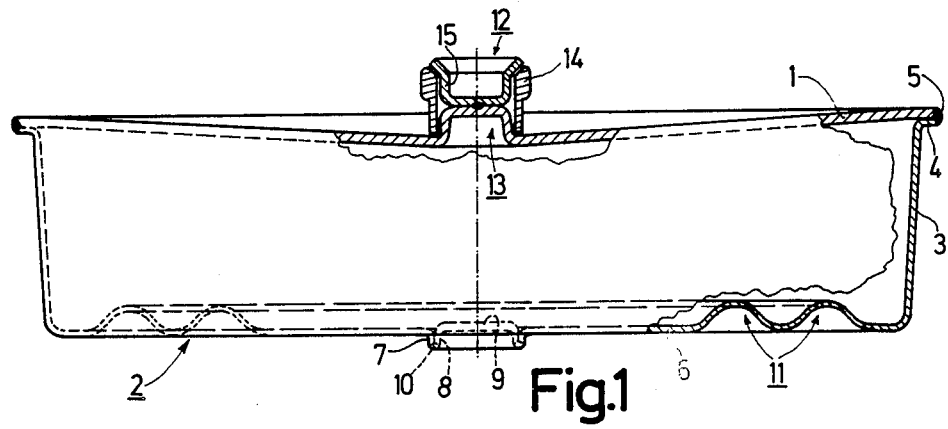
FIG. 1 shows a cold cartridge in which the discoid main wall acting together with the scraper and stirrer tool is curved conically inwards and is provided in its center with an abutment for the scraper and stirrer tool in the form of a handle and the bottom wall of the base has beads.

The cold cartridge shown in FIG. 1 includes two parts joined together, of which one part is the discoid main wall 1 facing the scraper and stirrer tool of the ice-cream maker and the other part is a trough-shaped base 2. The discoid main wall 1 is designed to be inherently stable, which is important to ensure that scraper and stirrer tool can act efficiently with it, so that ice-cream forming on it can be scraped off efficiently and uniformly. The inherent stability is obtained through a suitable selection of wall thickness and a curvature. In this particular case, the discoid main wall is curved conically inwards. The trough-shaped base 2 is designed such that at least one of its walls is flexible, so that the base can adapt reversibly to changes in volume of a latent heat storage medium in the cold cartridge on phase transition of the latter between fluid and solid and vice versa. The discoid main wall 1 is not deformed as a result. Such changes in volume may constitute several percent by volume, so that the base has to be correspondingly flexible, which is obtained by a relatively thin wall thickness or an appropriate shape. Particularly suitable materials for both parts are plates of special steel, for example chrome nickel steel, which are resistant to corrosion and are suitable for deep drawing and welding. The wall thickness selected for the discoid main wall 1 could, for example, be 1.2 mm and that of the base 2 0.8 mm.

The trough-shaped base has an edge 4 angled outwards at the top end of its circumferential walling 3, onto which the discoid main wall 1 is fitted around its circumference. The two parts are joined around the circumference by a weld seam 5. An opening with an outwardly flanged edge 7 is provided in the bottom wall 6 of the base 2, serving for the filling of a latent heat storage medium into the cold cartridge. After filling with this latent heat storage medium, this opening is sealed with a plate 9, also having a flanged edge 8, after which the free ends of the flanged edges 7 and 8 are joined together by means of a welded seam 10. It is essential that the cold cartridge is filled as completely as possible with latent heat storage medium so that it contains no air bubbles which would collect at the highest point of the cold cartridge in its operating position as shown in FIG. 1, which would be in the vicinity of the discoid main wall 1. Such air bubbles would considerably impair the transmission of heat between the latent heat storage medium and the discoid main wall 1, which would lead to an irregular formation of ice-cream on the discoid main wall 1. In this context, the curvature of the discoid main wall 1 provided with a view to increasing the stability, has a further advantage since any air bubbles contained in the cold cartridge collect at the highest point of the curvature, which in this embodiment would be in the region of the circumference of the discoid main wall 1. This means that such air bubbles would collect in an area which is not very detrimental to the formation of ice-cream, so that the major part of the ice-cream formation would not be impaired, which also applies to the embodiment according to FIG. 3 described hereinafter.

To further benefit the flexibility of the base 2, the bottom wall 6 in this embodiment is provided with beads 11, as a result of which the bottom wall 6 has particularly good reversible flexibility. It should be mentioned that the base 2 does not necessarily have to be designed as single part, but may also be composed of several parts, for example of a circumferential walling 3 and a separate bottom wall 6, which could then be joined to a trough-shaped base 2 by means of a welded joint.

It has also proven to be appropriate for the ratio of surface area in $cm^2$ of the discoid main wall 1 serving to act together with the scraper and stirrer tool to the volume in $cm^3$ of the latent heat storage medium to lie between 0.3 and 0.6, preferably between 0.34 and 0.39. In this way a good transmission of heat between the latent heat storage medium and the discoid main wall 1 is obtained, which does not proceed too rapidly nor too slowly, so that the formation of ice-cream occurs efficiently and uniformly. If the transmission of heat were to occur too rapidly this might result in the formation of lumps in the ice-cream, or the ice-cream forming could freeze too solidly onto the discoid main wall 1 so that it could no longer be scraped off efficiently by the scraper and stirrer tool. In the case of too slow a transmission of heat, this might result in greater losses of heat which could have the consequence of not enough ice-cream being formed. It has proven to be very effective for the latent heat storage medium to be one which is based on a eutectic mixture of water and a salt hydrate which contains a further 0.1 to 6 percent by volume of a second water-salt hydrate eutectic, the melting point of which is lower than that of the pure latent heat storage medium. Such latent heat storage mediums have in particular the property of a uniform expansion in phase transition which is advantageous in respect of the required flexibility of the base 2, since with a uniform expansion the danger of damage to the base 2 is significantly reduced.

As FIG. 1 shows, an abutment 12 is provided for the scraper and stirrer tool in the center of the discoid main wall 1 in the form of a part raised from the latter. For this there is provided in the center of the discoid main wall 1 an outward facing convexity 13, on which a sleeve 14, made possibly of plastic, is mounted. A vessel 15 is inserted, which, with its base, rests on the outside of the convexity 13 and is welded to it there. The inside of the vessel 15 thereby forms the abutment for a free end of the scraper and stirrer tool, so that the latter can interact particularly reliably with the discoid main wall 1. The entire raised part, together with the sleeve 14, can be used as a handle, whereby the cold cartridge is simple to manipulate, in particular in its insertion into the ice-cream maker and removal from the latter. Such an outward facing convexity 13 on the discoid main wall 1 constitutes a higher lying space, in the same way as the space formed by the inward facing curvature of the discoid main wall 1 in the area of the edging of the cold cartridge, in which any air bubbles contained in the cold cartridge can collect. Such air bubbles collecting in the convexity 13 do not impair the formation of ice-cream on the discoid main wall 1, since they lie in the central area of the scraper and stirrer tool where there is no ice-cream formation.

Figure 2:
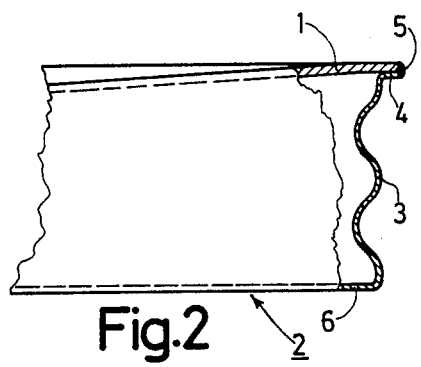
FIG. 2 shows a variation of the embodiment according to FIG. 1 in which a cold cartridge having the circumferential walling of the base takes the form of a spring bellows.

In the embodiment according to FIG. 2, a cold cartridge is shown with a base 2, the particular flexibility of which results from the fact that its circumferential walling 3 takes the form of a corrugated spring bellows. In this way the entire base 2 is rendered highly flexible, so that it can adapt well to the change in volume of the latent heat storage medium in phase transition. If required, the bottom wall 6 of the base 2 could also be provided with beads in this case, whereby the flexibility of the base 2 could be increased even further.

Figure 3:
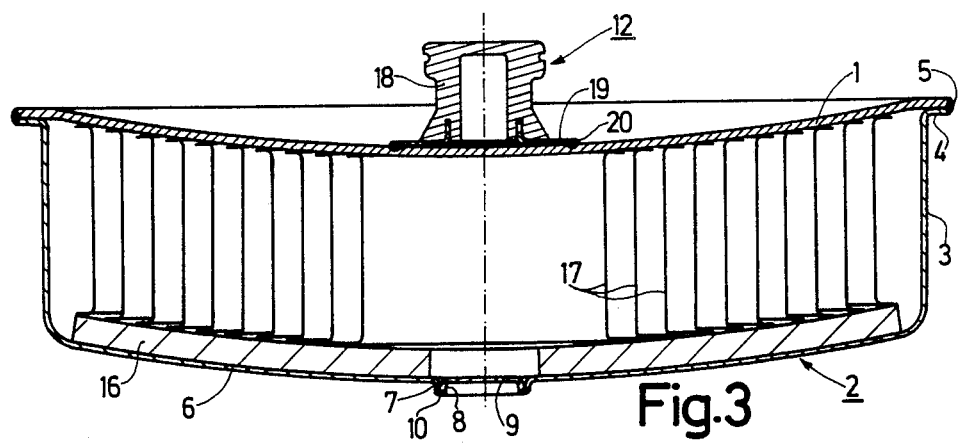
FIG. 3 shows a cold cartridge in which the discoid main wall, acting together with the scraper and stirrer tool is curved inwards in a cap shape, having in its center an abutment for the scraper and stirrer tool in the form of a handle.

In the embodiment according to FIG. 3, the discoid main wall 1 is curved inwards in a cap shape which provides a partially high inherent stability. In this embodiment, a gas spring is arranged inside the cold cartridge in the vicinity of the bottom wall 6 of the base 2, which takes the form a foam rubber disc. Such a foam rubber disc, which is made possibly of natural rubber or silicon rubber with mainly closed pores, has the property of being resiliently flexible. It is capable of compensating in part for the change in volume of the latent heat storage medium in phase transition, whereby the demands made of the flexibility of the base 2 are significantly reduced. Such a foam rubber disc also has a heat-insulating effect, thus reducing heat loss from the base and having a favorable effect on ice-cream formation.

There are, of course, other possible designs for such a gas spring containing a yielding occluded gas. Such a gas spring may also comprise a flat container with flexible walls. It has also proven to be simple for the gas spring to consist of a spirally wound rubber hose sealed at both ends. Such gas springs may contain air or a special gas.

In this embodiment heat-conducting plates 17 are also arranged inside the cold cartridge, which are in heat-conducting contact with the discoid main wall 1. The transmission of heat from the latent heat storage medium to the discoid main wall 1 is thereby particularly favored in the known manner. These heat-conducting plates may, for example, consist of a spirally wound copper strip, of which both edges are angled, whereby the one angle is supported on the discoid main wall 1 and the other angle on the foam rubber disc 16. Other shapes and materials are, of course, also suitable for such heat conducting plates, although it is always important that they should be in good heat-conducting contact with the discoid main wall 1. Such heat conducting plates may also for example, be welded onto the discoid main wall 1.

There is also provided in this embodiment in the center of the discoid main wall 1 an abutment 12 for the scraper and stirrer tool, which is designed as a handle and in this case comprises a substantially cylindrical part 18, which on its wall facing the discoid main wall is joined to a metal disc 19, which is joined circumferentially by a welded seam 20 to the discoid main wall 1. For such an abutment 12 a recess corresponding to the cylindrical part 18 of the abutment 12 is provided at the end of the central part of the scraper and stirrer tool of the ice-cream maker. Through such an arrangement of the scraper and stirrer tool in the vicinity of the cold cartridge, it is again ensured that any ice-cream forming on the discoid main wall 1 is scraped off efficiently and uniformly by the scraper and stirrer tool.

Figure 4:
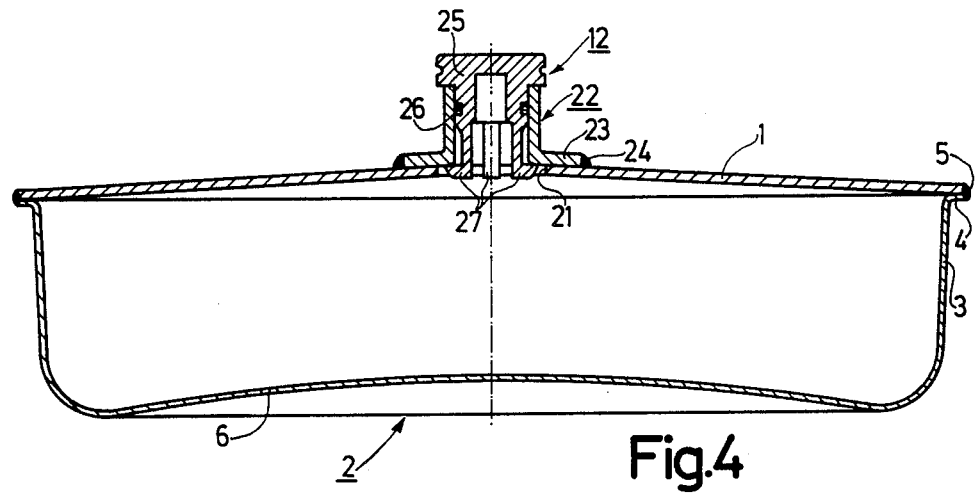
FIG. 4 shows a cold cartridge in which the discoid main wall acting together with the scraper and stirrer tool is curved conically outwards and in its center has an abutment for the scraper and stirrer tool in the form of a handle, serving as a sealable filling opening for the latent heat storage medium.

In the embodiment according to FIG. 4, the discoid main wall 1 is curved conically outwards. This offers the advantage that any air bubbles contained in the cold cartridge can only collect in the center of the discoid main wall 1, where they do not impair the formation of ice-cream, since they lie in the central area of the scraper and storer tool where there is no ice-cream formation. The bottom wall 6 of the base 2 is in this embodiment curved inwards, thus providing an excellent flexibility of the base 2, since such a bottom wall can adapt particularly well to the change in volume of the latent heat storage medium in phase transition.

In the center of the discoid main wall 1 an abutment 12 also designed in this embodiment as a handle is provided which corresponds in its function to that shown in the embodiment in FIG. 3. This abutment 12 is, however, also designed in this case as a sealable fitting opening for the latent heat storage medium. The discoid main wall 1 has an opening 21 in its center, to which a sleeve 22 directed outwards runs coaxially, having an angled edge 23 which lies against the outside of the discoid main wall 1 and around its edge is joined to the discoid main wall 1 by a welded seam 24. In this way, the sleeve 22 constitutes a filler neck for the latent heat storage medium. The opening of this filler neck is sealable with a stopper 25, which with its peripheral area continuing beyond the sleeve 22 forms the abutment 12 for the scraper and stirrer tool. For efficient sealing a gasket 26 is inserted into the shaft of the stopper 25. To secure the stopper 25 on the sleeve 22, several hooks 27 arranged with angular displacement are provided on the sleeve, gripping resiliently over the angled edge 23 of the sleeve 22 from the inside. The filling opening designed in this way lies at the highest point of the cold cartridge, whereby it is ensured that the latter can be filled as full as possible with latent heat storage medium.

Figure 5:
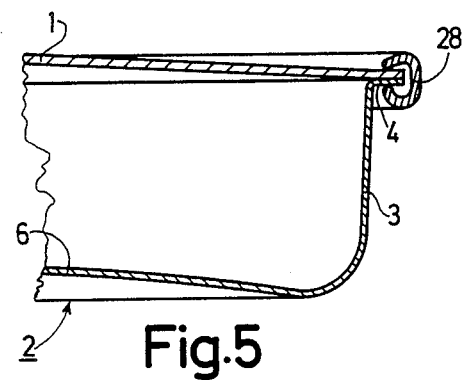
FIG. 5 shows according to a cold cartridge according to FIG. 4, in which a base made of a resiliently flexible plastic is connected to the discoid main wall acting together with the scraper and stirrer tool by means of a clamping ring with a U-shaped section.

In this particular embodiment, the base 2 is made from a special steel plate, whereby the circumferential walling 3 has an outwardly angled edge 4 which is joined by a welded seam to the discoid main wall 1. It has proven to be very simple and advantageous for the base 2 to be manufactured from a resiliently flexible plastic, since in this way an excellent flexibility of the base is obtained with a simple manufacturability of the latter. A transparent resiliently flexible plastic could be used to particular advantage in this case, since the state of aggregation of the latent heat storage medium can then be determined visually. It can then be established quite simply, for example, whether the latent heat storage medium contained in the cold cartridge is completely frozen and whether the cold cartridge is thus ready for ice-cream production. FIG. 5 shows the joining of such a base 2 made of plastic to the discoid main wall 1, which may occur, for example, by means of a clamping ring 28 with a U-shaped cross section, which grips the angled edge 4 of the circumferential wall 3 of the base 2 and the discoid main wall 1 in its peripheral zone and holds these pressed against each other.

As is clear from the above, there is a series of variations of the described embodiments without departing the scope of the invention. This applies in particular to the design of the inherently stable die-cast part forming the discoid main wall 1 and the at least partially flexible, trough-shaped base 2 connected to the latter.

What is claimed is:

1. A discoid cold cartridge insertable into an ice-cream maker and filled with a latent heat storage medium, comprising:
a first part including a discoid main wall facing a scraper and stirrer tool of said ice-cream maker, said wall being adapted to coact with said scraper and stirrer tool, said wall having an inherently stable, outwardly curved shape, whereby the formation of the air bubbles on the portion of said first part most effectively cooperating with said scraper and stirrer tool is substantially eliminated, and
a second part connected to said first part to form said cartridge, said second part including a trough-shaped base, said base having at least one flexible wall reversibly adaptable to the change in volume of the latent heat storage medium phase transition.

2. The cold cartridge according to claim 1 wherein said trough-shaped base includes a bottom wall running essentially curved in parallel to the curvature of said discoid main wall and wherein an outwardly curved sealable filling opening for the latent heat storage medium is provided in one of said two curved walls.

3. The cold cartridge according to claim 1 wherein said trough-shaped base is composed of resiliently flexible plastic.

4. The cold cartridge according to claim claim 1 wherein said trough-shaped base is made of transparent resiliently flexible plastic.

5. The cold cartridge according to claim 1 wherein the ratio of the surface area in cm$^2$ of said discoid main wall serving to interact with the scraper and stirrer tool to the volume in cm$^3$ of the latent heat storage medium lies in the range between 0.3 and 0.6.

6. The cold cartridge according to claim 1 wherein the ratio of the surface area in cm$^2$ of said discoid main wall serving to act together with the scraper and stirrer tool to the volume of the latent heat storage medium in cm$^3$ is in the range between 0.34 and 0.39.

7. The cold cartridge according to claim 1 wherein an abutment is provided for the scraper and stirrer tool of the ice-cream maker in the centre of the discoid main wall serving to act together with the scraper and stirrer tool said abutment being constituted by a part usable as a handle raised from the discoid main wall.

8. The cold cartridge according to claim 7 wherein said abutment constitutes a sealable filling opening for the latent heat storage medium.

9. The cold cartridge according to claim 1 wherein said latent heat storage medium is made on the basis of a eutectic mixture of water and a salt hydrate, which contains 0.1 to 6% by volume of a second water-salt hydrate eutectic, the melting point of which is lower than that of the pure latent heat storage medium.

* * * * *